US010773349B2

(12) United States Patent
Isobe

(10) Patent No.: US 10,773,349 B2
(45) Date of Patent: Sep. 15, 2020

(54) MACHINE TOOL AND CONTROL METHOD FOR MACHINE TOOL

(71) Applicant: FANUC CORPORATION, Yamanashi (JP)

(72) Inventor: Gaku Isobe, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 47 days.

(21) Appl. No.: 16/133,942

(22) Filed: Sep. 18, 2018

(65) Prior Publication Data

US 2019/0091816 A1 Mar. 28, 2019

(30) Foreign Application Priority Data

Sep. 25, 2017 (JP) ................................. 2017-184000

(51) Int. Cl.
  *B23Q 3/157* (2006.01)
  *B23Q 3/155* (2006.01)
  *G05B 19/4093* (2006.01)

(52) U.S. Cl.
  CPC .... *B23Q 3/15534* (2016.11); *G05B 19/40938* (2013.01); *B23Q 3/15706* (2013.01);
  (Continued)

(58) Field of Classification Search
  CPC ............ B23Q 3/15503; B23Q 3/15534; B23Q 3/15706; B23Q 3/1572; B23Q 3/15722;
  (Continued)

(56) References Cited

U.S. PATENT DOCUMENTS 6,090,025 A   7/2000 Matsuoka et al.
6,719,677 B2 * 4/2004 Izumi ................. B23Q 3/15526
                                                    318/672
(Continued)

FOREIGN PATENT DOCUMENTS

CN   101045281 A   10/2007
CN   103801967 A    5/2014
(Continued)

OTHER PUBLICATIONS

Chinese Office Action including Search Report issued by the State Intellectual Property Office of People's Republic of China in relation to Chinese Application No. 201811107874.1 dated Feb. 10, 2020 (5 pages) along with English language translation (6 pages).

(Continued)

*Primary Examiner* — Sunil K Singh
*Assistant Examiner* — Michael Vitale
(74) *Attorney, Agent, or Firm* — Robert P. Michal, Esq.; Carter, DeLuca & Farrell LLP

(57) ABSTRACT

A machine tool having a tool magazine for changing a tool attached to a spindle is equipped with an initial operation speed setting unit configured to set the operation speed of the tool magazine to an initial operation speed, an operation speed adjusting unit configured to be operated by the user to thereby adjust the operation speed of the tool magazine relative to the initial operation speed, an actuator configured to actuate the tool magazine, an operation speed acquisition unit configured to acquire the operation speed of the tool magazine after adjustment of the operation speed made by the operation speed adjusting unit, and an actuator control unit configured to control the actuator to actuate the tool magazine at the operation speed acquired by the operation speed acquisition unit.

7 Claims, 16 Drawing Sheets

(52) U.S. Cl.
CPC .................. *B23Q 3/15722* (2016.11); *G05B 2219/50242* (2013.01); *Y10T 483/12* (2015.01); *Y10T 483/1755* (2015.01); *Y10T 483/1795* (2015.01)

(58) Field of Classification Search
CPC ............... Y10T 483/12; Y10T 483/123; Y10T 483/127; Y10T 483/13; Y10T 483/179; Y10T 483/1793; Y10T 483/1795; Y10T 483/1873; Y10T 483/1882; Y10T 483/1755; G05B 19/409; G05B 2219/50242
USPC .......... 483/4, 5, 6, 7, 54, 55, 56, 66, 67, 39; 700/179
See application file for complete search history.

(56) References Cited

U.S. PATENT DOCUMENTS

| | | | | |
|---|---|---|---|---|
| 7,445,587 | B2* | 11/2008 | Kojima | B23Q 3/15706 483/56 |
| 9,339,905 | B2* | 5/2016 | Murota | B23Q 3/15706 |
| 2015/0072844 | A1* | 3/2015 | Murota | B23Q 11/0078 483/7 |
| 2015/0072845 | A1 | 3/2015 | Murota | |
| 2015/0186556 | A1 | 7/2015 | Murota et al. | |
| 2015/0367466 | A1* | 12/2015 | Isobe | B23Q 3/15534 483/5 |
| 2016/0184944 | A1* | 6/2016 | Isobe | B23Q 3/15713 483/5 |

FOREIGN PATENT DOCUMENTS

| | | |
|---|---|---|
| CN | 104669023 A | 6/2015 |
| JP | 08115113 A | 5/1996 |
| JP | H11114756 A | 4/1999 |
| JP | 11277369 A | 10/1999 |
| JP | 2000-308935 A | 11/2000 |
| JP | 2004-074357 A | 3/2004 |
| JP | 2005205503 A | 8/2005 |
| JP | 2009034794 A | 2/2009 |
| JP | 2009282973 A | 12/2009 |
| JP | 2012200857 A | 10/2012 |
| JP | 2015054370 A | 3/2015 |
| JP | 2015-127067 A | 7/2015 |
| KR | 10-2013-0128762 A | 11/2013 |
| WO | 2012061890 A1 | 5/2012 |

OTHER PUBLICATIONS

Decision to Grant a Patent issued by the Japanese Patent Office on Sep. 10, 2019 in corresponding Japanese Patent Application No. 2017-184000, with English translation.

Notice of Reasons for Refusal issued by the Japanese Patent Office in corresponding Japanese Patent Application No. 2017-184000 on Jul. 16, 2019, with English translation.

* cited by examiner

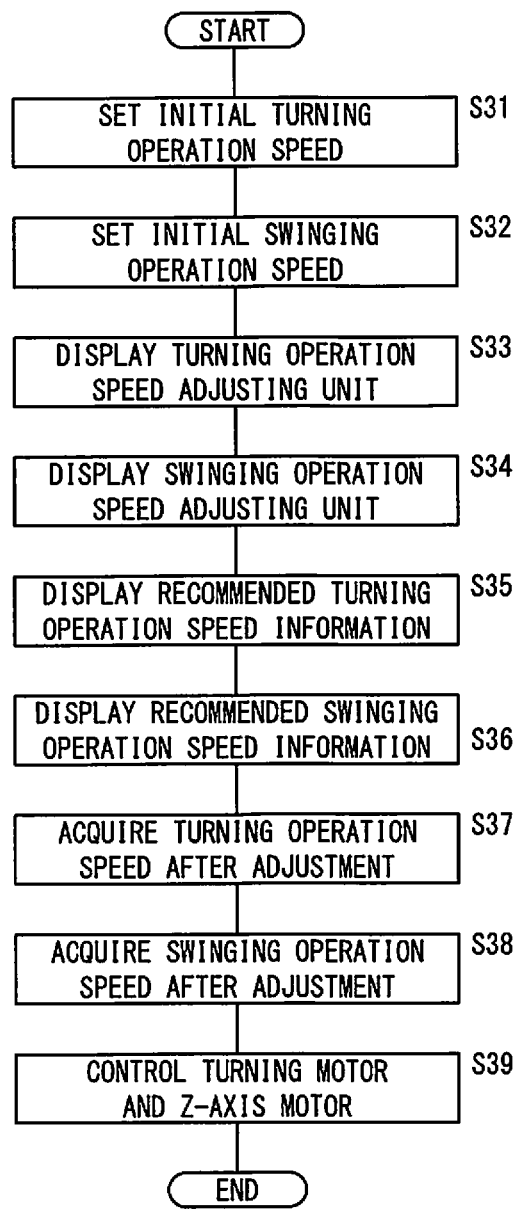

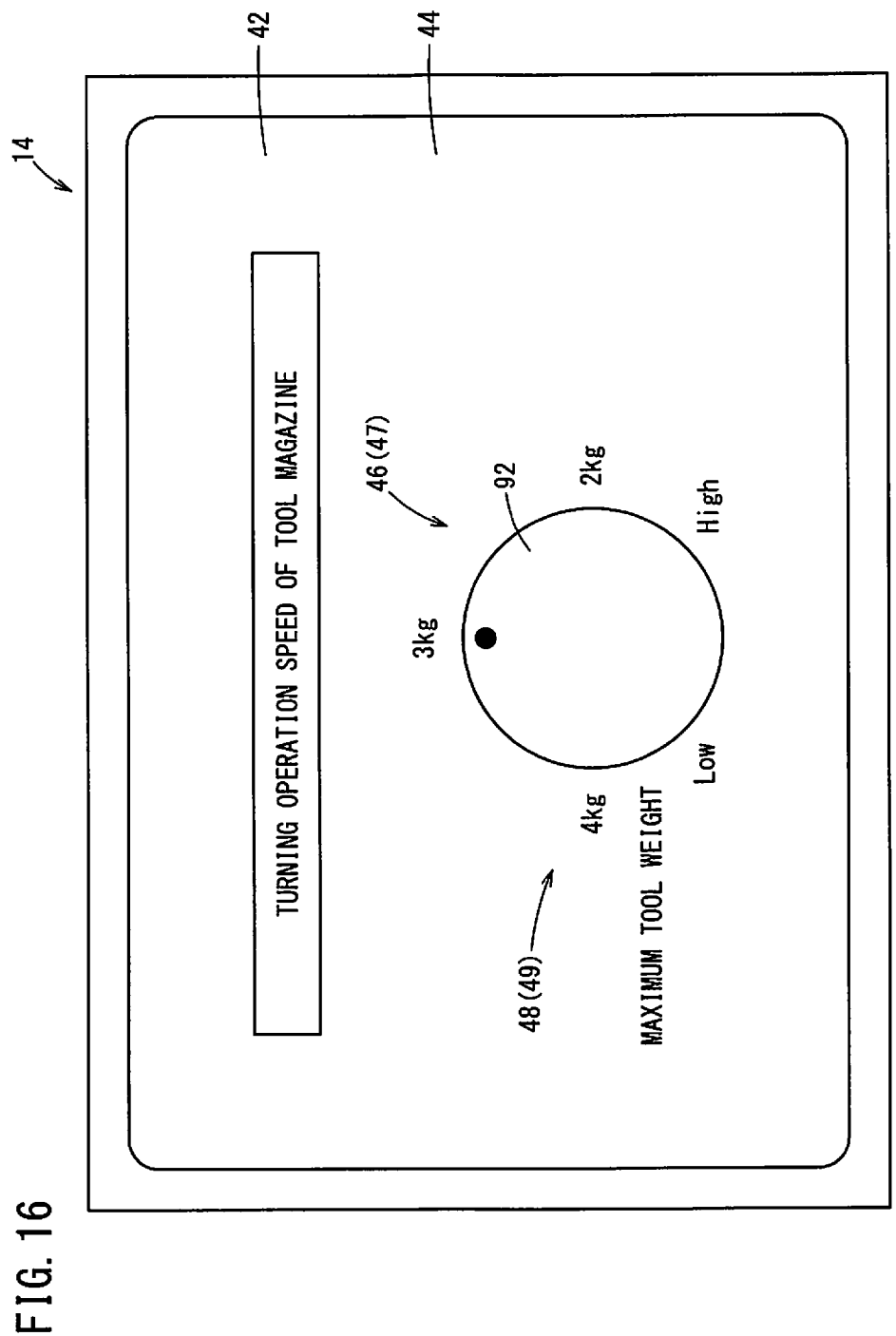

MACHINE TOOL AND CONTROL METHOD FOR MACHINE TOOL

CROSS-REFERENCE TO RELATED APPLICATION

This application is based upon and claims the benefit of priority from Japanese Patent Application No. 2017-184000 filed on Sep. 25, 2017, the contents of which are incorporated herein by reference.

BACKGROUND OF THE INVENTION

Field of the Invention

The present invention relates to a machine tool having a tool magazine for changing a tool attached to a spindle, and further relates to a control method for the machine tool.

Description of the Related Art

Japanese Laid-Open Patent Publication No. 2015-127067 discloses a technology that calculates the inertia of a tool magazine about a turning axis and that changes the turning speed of the tool magazine depending on the calculated inertia.

SUMMARY OF THE INVENTION

In the technology described in Japanese Laid-Open Patent Publication No. 2015-127067, it is impossible for the machine tool user to adjust the operation speed of the tool magazine.

The present invention has been made in order to solve the aforementioned problem, and it is an object of the present invention to provide a machine tool and a control method for the machine tool in which the user is able to adjust the operation speed of a tool magazine.

According to a first aspect of the present invention, there is provided a machine tool including a tool magazine configured to change a tool attached to a spindle, and the machine tool further includes an initial operation speed setting unit configured to set the operation speed of the tool magazine to an initial operation speed, an operation speed adjusting unit configured to be operated by the user to thereby adjust the operation speed of the tool magazine relative to the initial operation speed, an actuator configured to actuate the tool magazine, an operation speed acquisition unit configured to acquire the operation speed of the tool magazine after adjustment of the operation speed made by the operation speed adjusting unit, and an actuator control unit configured to control the actuator to actuate the tool magazine at the operation speed acquired by the operation speed acquisition unit.

According to a second aspect of the present invention, there is provided a control method for a machine tool having a tool magazine for changing a tool attached to a spindle, and the control method includes an initial operation speed setting step of setting the operation speed of the tool magazine to an initial operation speed, an operation speed adjusting step of adjusting the operation speed of the tool magazine relative to the initial operation speed by an operation speed adjusting unit being operated by the user, an operation speed acquisition step of acquiring the operation speed of the tool magazine after the adjustment in the operation speed adjusting step, and an actuator control step of controlling an actuator configured to actuate the tool magazine, so that the tool magazine operates at the operation speed acquired in the operation speed acquisition step.

According to the present invention, it is possible for the user to adjust the operation speed of the tool magazine.

The above and other objects, features, and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIG. 15 is a flowchart showing the flow of operation speed adjusting process executed by the control device in the fourth embodiment; and FIG. 16 is a schematic view showing a display operating device in a first modification of the embodiments.

DESCRIPTION OF THE PREFERRED EMBODIMENTS

First Embodiment

[Configuration of Machine Tool]

Figure 1:
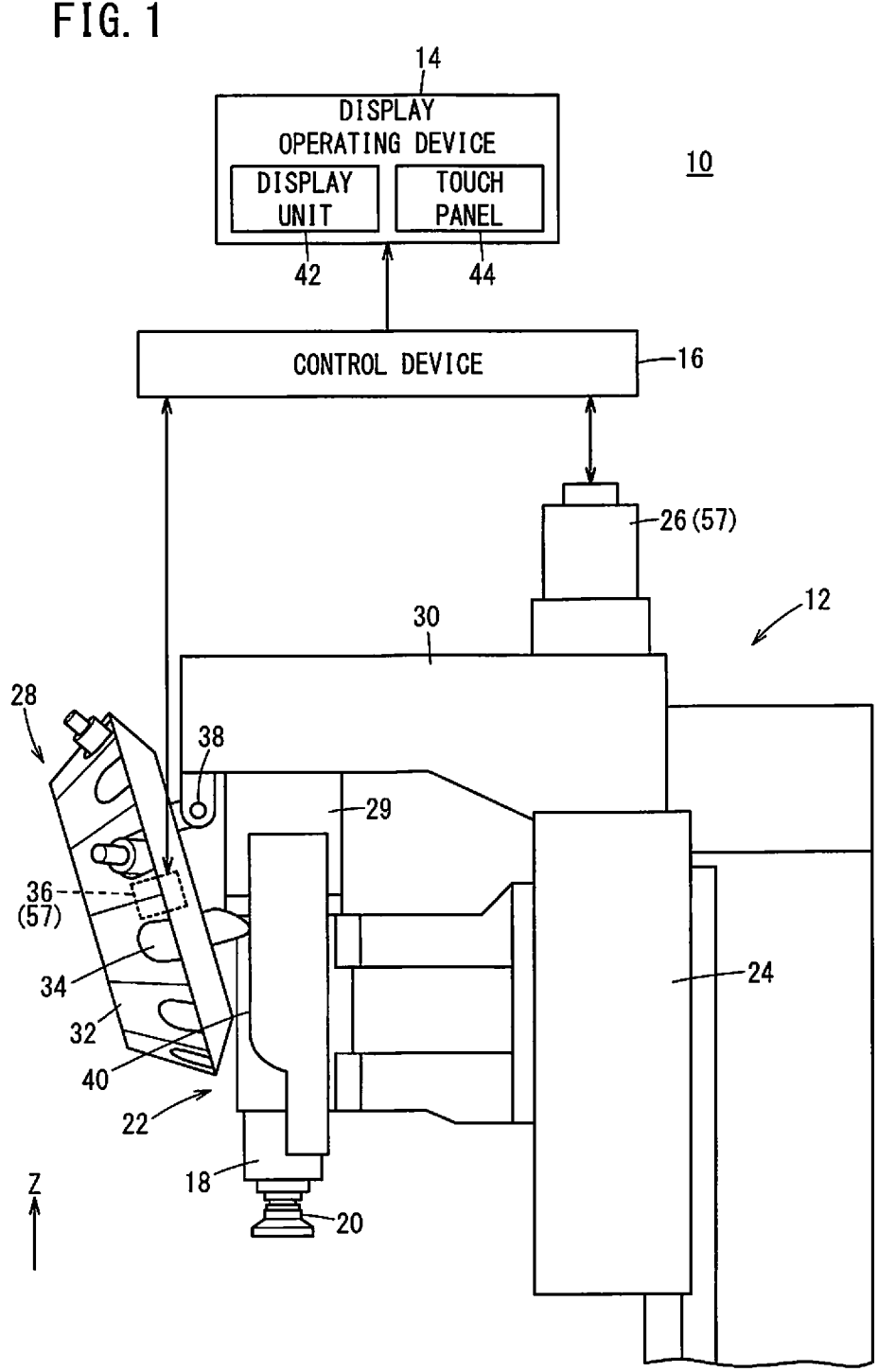
FIG. 1 is a schematic view of a machine tool according to a first embodiment of the present invention.

Hereinafter, a machine tool 10 according to a first embodiment will be described. FIG. 1 is a schematic view of the machine tool 10 in the first embodiment. The machine tool 10 is provided with a machine tool body 12, a display operating device 14 and a control device 16. The machine tool 10 is a vertical machining center and machines a workpiece (not shown) with a tool 20 attached to a spindle 18 of the machine tool body 12.

(Configuration of Machine Tool Body)

Figure 2:
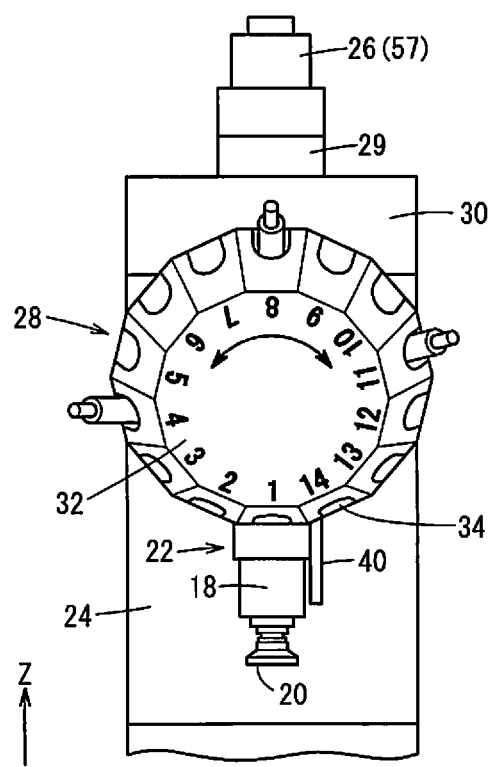
FIG. 2 is a schematic front view showing a spindle head of a machine tool body and its vicinity.

FIG. 2 is a schematic front view showing a spindle head 22 of the machine tool body 12 and its vicinity. Incidentally, FIG. 1 shows the machine tool body 12 as a schematic side view showing a vicinity of the spindle head 22. In FIGS. 1 and 2, the vertical direction is defined as a Z-axis, the upward direction as a positive direction and the downward direction as a negative direction.

The machine tool body 12 is provided with the spindle 18, the spindle head 22, a column 24, and a tool magazine 28. The spindle 18 is attached to the spindle head 22 rotatably about a rotary axis parallel to a Z-axis direction. A spindle motor 29 is provided on the spindle head 22. The spindle 18 is rotationally driven by the spindle motor 29. The tool 20 is removably inserted into an insertion hole (not shown) formed at a distal end of the spindle 18. The tool 20 is rotated integrally with the spindle 18. The spindle head 22 is mounted to the column 24 movably in the Z axis-direction. The spindle head 22 is driven together with the spindle 18 in the Z axis direction by a Z-axis motor 26.

The tool magazine 28 is provided on an arm portion 30 extending from the column 24 in the horizontal direction (FIG. 1). The tool magazine 28 is a device for automatically changing the tool 20 attached to the spindle 18. The tool magazine 28 in the present embodiment is a tool changer having a turret 32 turnably provided on the arm portion 30. On an outer peripheral side of the turret 32, a plurality of grips 34 are provided at regular intervals in the circumferential direction. The grips 34 each removably grip and hold a tool 20. The tool magazine 28 is connected to a turning motor 36. The tool magazine 28 performs a turning operation by being driven by the turning motor 36.

Figure 3:
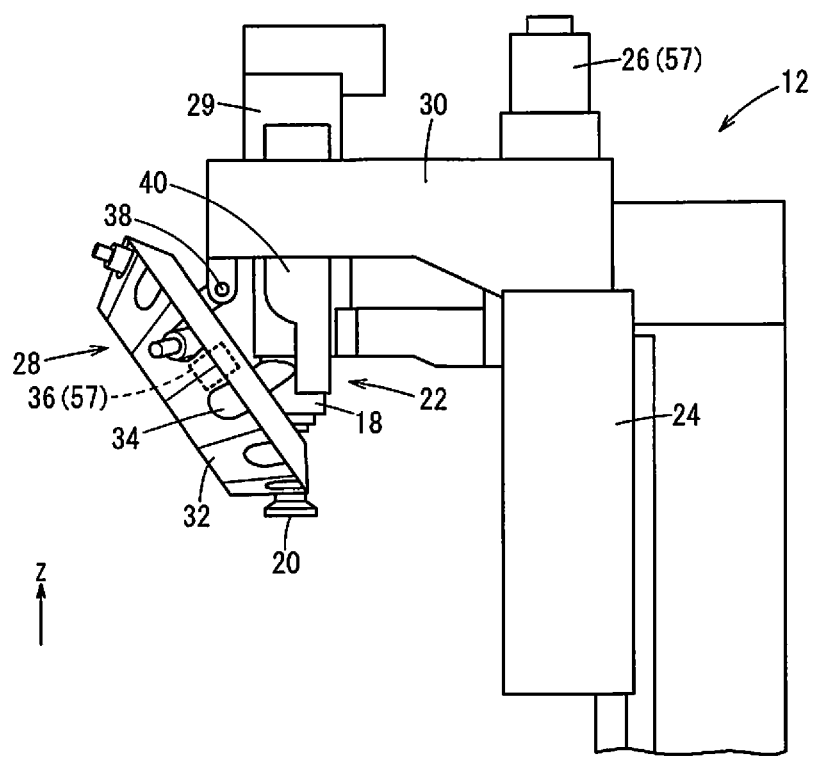
FIG. 3 is a schematic side view of the machine tool body, showing a state that the spindle head is moved to a Z-axis positive direction side.

The tool magazine 28 is provided to be swingable about a mounting portion 38 of the arm portion 30. The spindle head 22 is provided with a cam 40 for swinging the tool magazine 28 (FIG. 1). FIG. 3 is a schematic side view of the machine tool body 12, and shows a state that the spindle head 22 is moved to the Z-axis positive direction side. FIG. 1 shows the machine tool body 12 in another state that the spindle head 22 is moved to the Z-axis negative direction side. When the spindle head 22 is moved to the Z-axis positive direction side, the tool magazine 28 performs a swinging operation in a direction approaching the spindle 18 (FIG. 3). When the spindle 18 is moved to the Z-axis negative direction side, the tool magazine 28 performs a swinging operation in a direction away from the spindle 18 (FIG. 1).

(Configuration of Display Operating Device)

The display operating device 14 is provided with a display unit 42 and a touch panel 44 (FIG. 1). The display unit 42 is, for example, a liquid crystal display or the like and displays letters, symbols, numerals, images and the like on a screen thereof. The touch panel 44 is a transparent sheet-shaped member affixed to the screen of the display unit 42 and is, for example, a resistive film type touch panel. The touch panel 44 detects and outputs a position at which the touch panel 44 is pressed by the operator's finger, a pen or the like, as coordinates on a coordinate plane set on the touch panel 44. Incidentally, a keyboard, a mouse or the like may be used in place of the touch panel 44.

Figure 4:
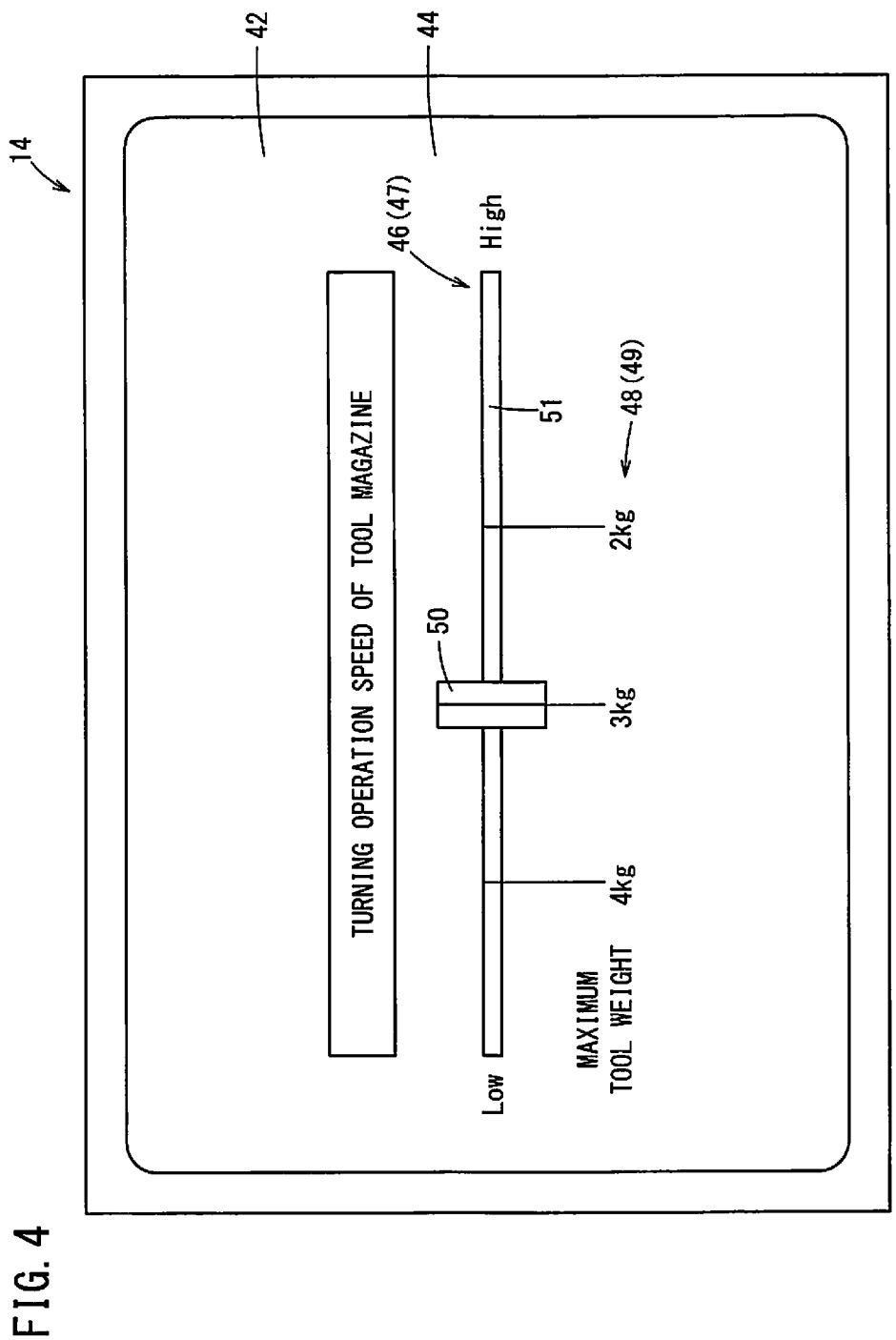
FIG. 4 is a schematic view showing a display operating device in the first embodiment.

FIG. 4 is a schematic view showing the display operating device 14. A turning operation speed adjusting unit 46 and recommended turning operation speed information 48 are displayed on the display unit 42 of the display operating device 14. As will be described later in detail, in the present embodiment, it is possible for the user to adjust the speed of the turning operation (i.e., turning operation speed or turning motion speed) of the tool magazine 28. Incidentally, although the following describes the adjustment of the turning operation speed of the tool magazine 28, it is possible likewise to adjust the speed of the swinging operation (i.e., swinging operation speed or swinging motion speed) of the tool magazine 28.

The turning operation speed of the tool magazine 28 is adjusted by the user operating through the touch panel 44 the turning operation speed adjusting unit 46 displayed on the display unit 42. As shown in FIG. 4, the turning operation speed adjusting unit 46 is displayed on the display unit 42 as a slider 50 movable along a bar 51. The turning operation speed of the tool magazine 28 is adjusted by the user sliding the slider 50. Although in this embodiment the slider 50 of the turning operation speed adjusting unit 46 is displayed on the display operating device 14, a physical or real slider 50 may be provided on the control device 16. The turning operation speed adjusting unit 46 constitutes an operation speed adjusting unit 47.

A recommended speed in the turning operation (i.e., recommended turning operation speed) of the tool magazine 28 is determined in advance in accordance with the weight of the heaviest tool 20 (maximum tool weight) of the tools 20 attached to the tool magazine 28. The recommended turning operation speed information 48 indicates a position on the bar 51 corresponding to a recommended turning operation speed for each of predetermined weights (2 kg, 3 kg, 4 kg, for example) of the tools 20. FIG. 4 directly indicates the positions on the bar 51 based on the recommended turning operation speed information 48. Alternatively, in the case, for example, where the bar 51 is graduated for the turning operation speeds, a correspondence table showing the correspondence relationship between weights of the tools 20 and graduations of the turning operation speeds may be displayed as the recommended turning operation speed information 48. The recommended turning operation speed information 48 constitutes recommended operation speed information 49.

(Configuration of Control Device)

Figure 5:
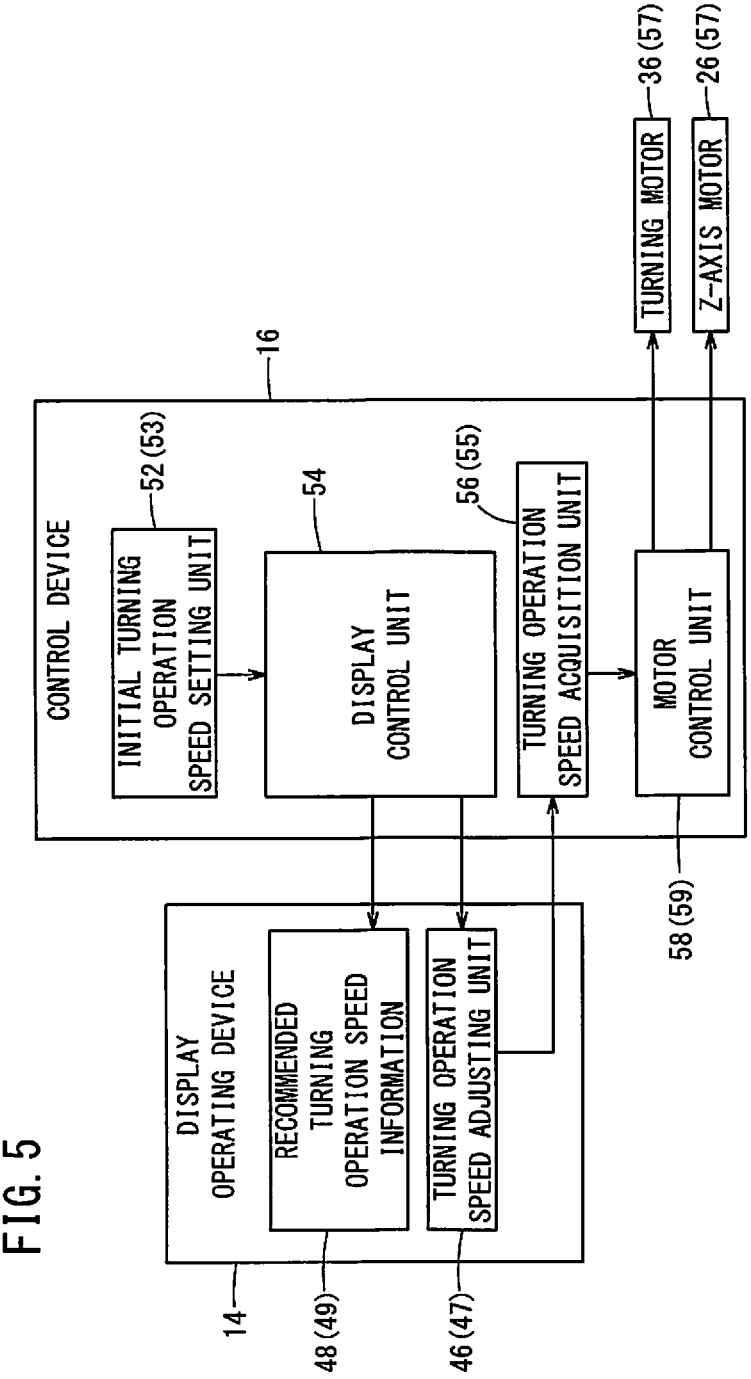
FIG. 5 is a block diagram showing the functional configuration of a control device in the first embodiment.

FIG. 5 is a block diagram showing the functional configuration of the control device 16. The control device 16 includes an initial turning operation speed setting unit 52, a display control unit 54, a turning operation speed acquisition unit 56, and a motor control unit 58.

The initial turning operation speed setting unit 52 sets an initial value of the turning operation speed of the tool magazine 28. In the present embodiment, a recommended turning operation speed corresponding to the case of the maximum tool weight being 3 kg is set as the initial value for the turning operation speed of the tool magazine 28. Incidentally, the initial value of the turning operation speed of the tool magazine 28 is not limited to the recommended turning operation speed corresponding to the case of the maximum tool weight being 3 kg. The initial turning operation speed setting unit 52 constitutes an initial operation speed setting unit 53.

The display control unit 54 controls the display operating device 14 to display the turning operation speed adjusting unit 46 and the recommended turning operation speed information 48. The display control unit 54 controls the display operating device 14 so that the slider 50 of the turning operation speed adjusting unit 46 is displayed at a position on the bar 51 corresponding to the initial value (i.e., the recommended turning operation speed corresponding to the case of the maximum tool weight being 3 kg) of the turning operation speed of the tool magazine 28.

The user is able to adjust the turning operation speed of the tool magazine 28 by moving the slider 50. For example, in the case of the maximum tool weight being 3 kg, the user is able to set the turning operation speed of the tool magazine 28 to be slower than the recommended turning operation speed by moving the slider 50 to a "Low" side relative to a "3 kg" position displayed on the bar 51. On the other hand, the user is able to set the turning operation speed of the tool magazine 26 to be faster than the recommended turning operation speed, by moving the slider 50 to a "High" side relative to the "3 kg" position. The turning operation speed acquisition unit 56 acquires the turning operation speed of the tool magazine 28 after the adjustment has been made by the turning operation speed adjusting unit 46. The turning operation speed acquisition unit 56 constitutes an operation speed acquisition unit 55.

The motor control unit 58 controls the Z-axis motor 26 and the turning motor 36 to make the tool magazine 28 change the tool 20 on the spindle 18. Incidentally, the Z-axis motor 26 and the turning motor 36 constitute actuators 57. The motor control unit 58 constitutes an actuator control unit 59. The motor control unit 58 controls the turning motor 36 in accordance with the turning operation speed of the tool magazine 28 that has been adjusted by the turning operation speed adjusting unit 46.

[Control for Tool Change]

When the tool 20 on the spindle 18 is changed, the motor control unit 58 first controls the Z-axis motor 26 so as to move the spindle head 22 toward the Z-axis positive direction. When the spindle head 22 is moved toward the Z-axis positive direction, the tool magazine 28 performs the swinging operation along the cam 40 to thereby move an empty grip 34 right beneath the spindle 18. At this time, the tool 20 attached to the spindle 18 is gripped by the empty grip 34.

Thereafter, the motor control unit 58 controls the Z-axis motor 26 to further move the spindle head 22 toward the Z-axis positive direction. When the spindle head 22 is moved toward the Z-axis positive direction, the tool 20 attached to the spindle 18 is handed over from the spindle 18 to the empty grip 34 and is completely pulled out from the insertion hole of the spindle 18. Thus, the tool magazine 28 is allowed to be turned without interference of the tool 20 with the spindle 18.

Next, the motor control unit 58 controls the turning motor 36 so as to turn the tool magazine 28 and thereby index a desired tool 20 (i.e., position a desired tool 20 right beneath the spindle 18). Then, the motor control unit 58 controls the Z-axis motor 26 so as to move the spindle head 22 toward the Z-axis negative direction side. When the spindle head 22 is moved toward the Z-axis negative direction, the indexed tool 20 is inserted into the insertion hole of the spindle 18.

Thereafter, the motor control unit 58 controls the Z-axis motor 26 so as to further move the spindle 18 toward the Z-axis negative direction. When the spindle head 22 is moved toward the Z-axis negative direction, the tool magazine 28 performs the swinging operation along the cam 40, and the grip 34 is then separated from the spindle 18. At this time, the tool 20 gripped by the grip 34 is completely handed over from the grip 34 to the spindle 18.

[Turning Operation Speed Adjusting Process]

Figure 6:
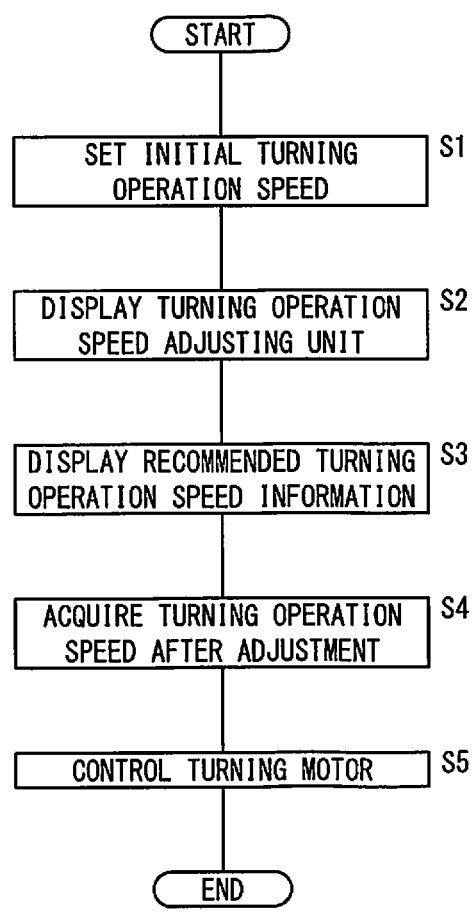
FIG. 6 is a flowchart showing the flow of turning operation speed adjusting process executed by the control device in the first embodiment.

FIG. 6 is a flowchart showing the flow of turning operation speed adjusting process executed by the control device 16. At step S1, an initial value of the turning operation speed of the tool magazine 28 is set at the initial turning operation speed setting unit 52, and the process proceeds to step S2.

At step S2, the display control unit 54 controls the display operating device 14 to display the turning operation speed adjusting unit 46, and the process proceeds to step S3. At step S3, the display control unit 54 controls the display operating device 14 to display the recommended turning operation speed information 48, and the process proceeds to step S4.

At step S4, the turning operation speed acquisition unit 56 acquires a turning operation speed of the tool magazine 28 which has been adjusted by the user operating the turning operation speed adjusting unit 46, and the process proceeds to step S5. At step S5, the motor control unit 58 controls the turning motor 36 to be driven at the turning operation speed of the tool magazine 28 acquired at step S4, and the process is ended.

[Operation and Effects]

In the case where the turning operation speed of the tool magazine 28 is fast, there is concern that the load on the turning motor 36 becomes larger, resulting in accelerated deterioration of the turning motor 36. On the other hand, in the case where the turning operation speed of the tool magazine 28 is slow, a problem occurs in that changing of the tool 20 on the spindle 18 requires a longer time, resulting in an elongated machining time. Even in the case where the turning operation speed of the tool magazine 28 is the same, the load on the turning motor 36 becomes larger as the weight of the tools 20 attached to the tool magazine 28 becomes larger.

For this reason, heretofore, there has been a technique in which the turning operation speed of a tool magazine 28 is set in accordance with the weight of tools 20 attached to the tool magazine 28. However, there is no flexibility for the user to adjust the turning operation speed of the tool magazine 28, and thus it has been impossible for the user to desirably adjust the turning operation speed of the tool magazine 28.

To solve the problem, in the present embodiment, the turning operation speed adjusting unit 46 is provided so that the user can operate the adjusting unit to adjust the turning operation speed of the tool magazine 28 relative to the initial value. Thus, it is possible to adjust the turning operation speed of the tool magazine 28 to a turning operation speed desired by the user.

Further, the present embodiment is configured to display the recommended turning operation speed information 48 which indicates a position on the bar 51 corresponding to the recommended turning operation speed of the tool magazine 28. In this case, the recommended turning operation speed is a speed recommended for a tool 20 having the maximum tool weight among the tools attached to the tool magazine 28. Thus, the user can adjust the turning operation speed of the tool magazine 28 by operating the slider 50 while using as a reference the position on the bar 51 indicated by the recommended turning operation speed information 48.

Further, in the present embodiment, the slider 50 movable on the bar 51 is displayed on the display operating device 14 as the turning operation speed adjusting unit 46. Thus, the user is able to input the turning operation speed of the tool magazine 28, not numerically, but in a manner of relatively speeding up or slowing down the turning operation speed relative to the initial value of the turning operation speed of the tool magazine 28 set by the initial turning operation speed setting unit 52.

Second Embodiment

A second embodiment partly differs from the first embodiment in the contents displayed by the display operating device 14 and the contents controlled by the control device 16. The configuration of the machine tool body 12 is the same as that in the first embodiment.

[Configuration of Machine Tool]

(Configuration of Display Operating Device)

Figure 7:
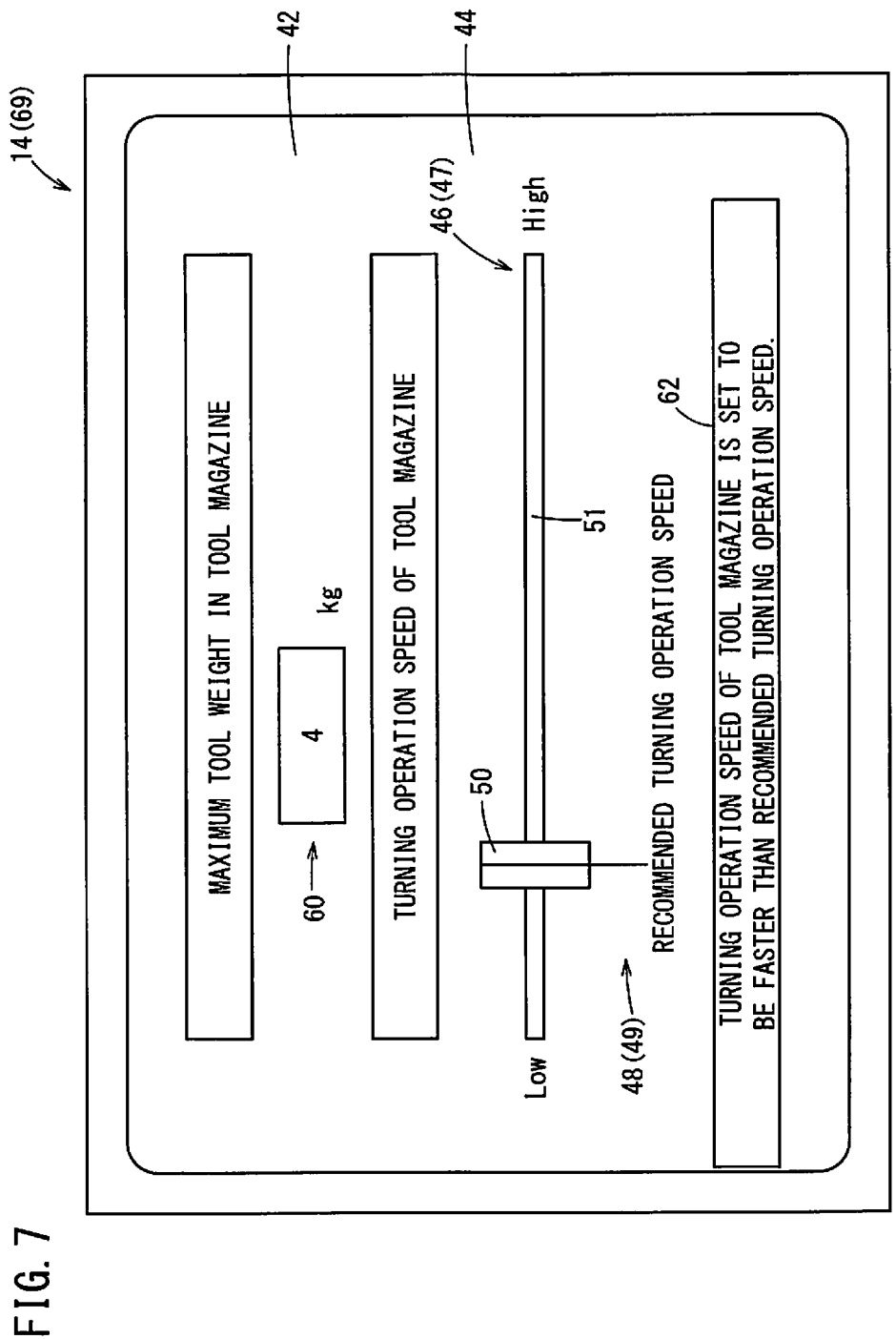
FIG. 7 is a schematic view showing a display operating device in a second embodiment of the present invention.

FIG. 7 is a schematic view showing the display operating device 14 in the second embodiment. The turning operation speed adjusting unit 46, the recommended turning operation speed information 48, a tool weight input unit 60, and notification information 62 are displayed on the display operating device 14.

The weight of the heaviest tool 20 (maximum tool weight) of the tools 20 attached to the tool magazine 28 is inputted to the tool weight input unit 60 by the user operating the touch panel 44.

The turning operation speed of the tool magazine 28 is adjusted by the user operating through the touch panel 44 the turning operation speed adjusting unit 46 displayed on the display unit 42. As shown in FIG. 7, the turning operation speed adjusting unit 46 is displayed on the display unit 42 as the slider 50 movable along the bar 51. The user slides the slider 50 to adjust the turning operation speed of the tool magazine 28.

The recommended turning operation speed information 48 indicates a position on the bar 51 corresponding to a recommended turning operation speed which depends on the maximum tool weight inputted to the tool weight input unit 60. The notification information 62 is displayed when the slider 50 is operated by the user and moved to a "High" side beyond the position on the bar 51 indicated by the recommended turning operation speed information 48.

(Configuration of Control Device)

Figure 8:
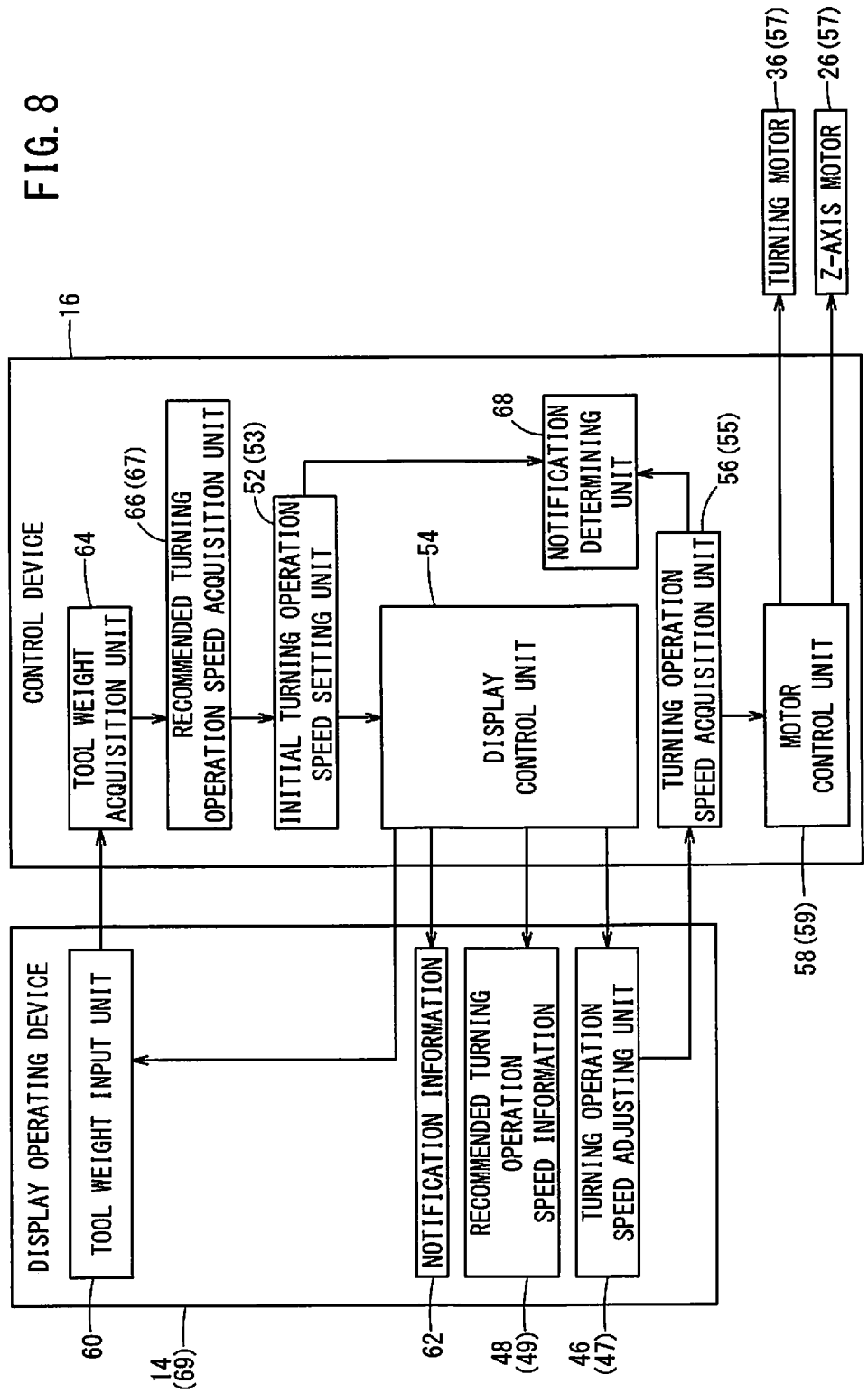
FIG. 8 is a block diagram showing the functional configuration of a control device in the second embodiment.

FIG. 8 is a block diagram showing the functional configuration of the control device 16 in the second embodiment. The control device 16 contains the initial turning operation speed setting unit 52, the display control unit 54, the turning operation speed acquisition unit 56, the motor control unit 58, a tool weight acquisition unit 64, a recommended turning operation speed acquisition unit 66 and a notification determining unit 68.

The tool weight acquisition unit 64 acquires the maximum tool weight inputted to the tool weight input unit 60 of the display operating device 14. Incidentally, the tool weight acquisition unit 64 may be configured to acquire the maximum tool weight that is automatically measured by a weight measuring instrument (not shown) provided at each of the grips 34, instead of acquiring the maximum tool weight from the information inputted to the tool weight input unit 60. The recommended turning operation speed acquisition unit 66 acquires a recommended turning operation speed corresponding to the maximum tool weight acquired by the tool weight acquisition unit 64. The recommended turning operation speed acquisition unit 66 may acquire the recommended turning operation speed from a map set in advance and which shows the relationship between maximum tool weight and recommended turning operation speed, or may acquire the recommended turning operation speed through calculation according to a predetermined formula set in advance. The recommended turning operation speed acquisition unit 66 constitutes a recommended operation speed acquisition unit 67.

The initial turning operation speed setting unit 52 sets the initial value of the turning operation speed of the tool magazine 28. In the present embodiment, the initial value of the turning operation speed of the tool magazine 28 is set to the recommended turning operation speed acquired by the recommended turning operation speed acquisition unit 66.

The turning operation speed acquisition unit 56 acquires a turning operation speed of the tool magazine 28 after the adjustment by the turning operation speed adjusting unit 46. The notification determining unit 68 determines whether or not the turning operation speed of the tool magazine 28 adjusted by the turning operation speed adjusting unit 46 and which has been acquired by the turning operation speed acquisition unit 56 is faster than the recommended turning operation speed acquired by the recommended turning operation speed acquisition unit 66. In the case where the turning operation speed of the tool magazine 28 after the adjustment is faster than the recommended turning operation speed, the notification determining unit 68 outputs a command to the display operating device 14 so as to display the notification information 62.

The display control unit 54 controls the display operating device 14 to display the turning operation speed adjusting unit 46, the recommended turning operation speed information 48 and the tool weight input unit 60. The display control unit 54 controls the display operating device 14 to display the slider 50 of the turning operation speed adjusting unit 46 at a position on the bar 51 corresponding to the initial value of the turning operation speed of the tool magazine 28.

In the case where the notification determining unit 68 determines that the turning operation speed of the tool magazine 28 after the adjustment is faster than the recommended turning operation speed, the display control unit 54 controls the display operating device 14 to display the notification information 62. As the notification information 62, a message is displayed to inform the user that the turning operation speed of the tool magazine 28 after the adjustment is faster than the recommended turning operation speed, by a message that "TURNING OPERATION SPEED OF TOOL MAGAZINE IS SET TO BE FASTER THAN RECOMMENDED TURNING OPERATION SPEED." or the like. In place of displaying the message as the notification information 62, various techniques may be adopted such as changing the color of the screen on the display operating device 14, emitting voice or notification sound from a speaker (not shown), turning on a light (not shown) or the like. Incidentally, the display operating device 14 constitutes a notification unit 69.

[Turning Operation Speed Adjusting Process]

Figure 9:
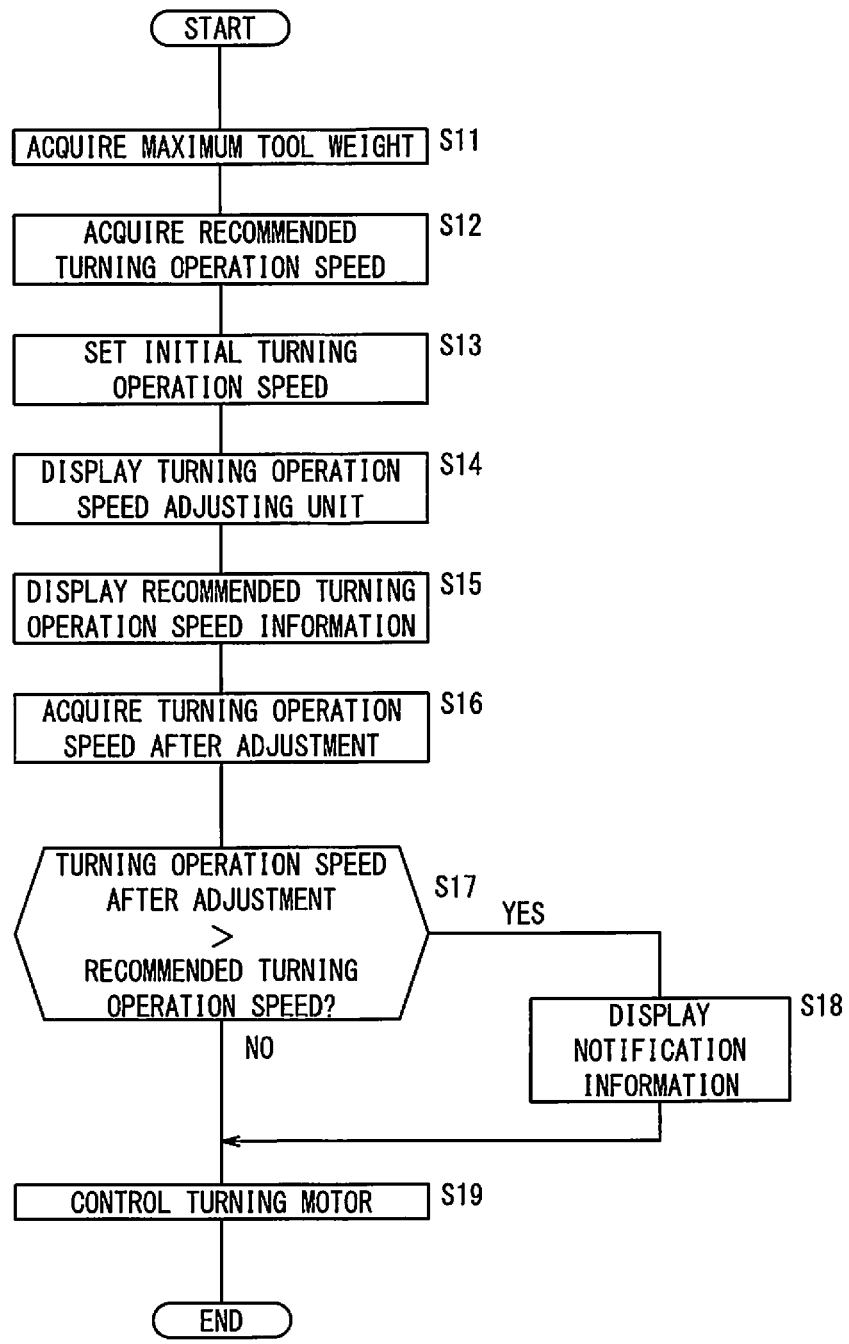
FIG. 9 is a flowchart showing the flow of turning operation speed adjusting process executed by the control device in the second embodiment.

FIG. 9 is a flowchart showing the flow of turning operation speed adjusting process executed by the control device 16. At step S11, the tool weight acquisition unit 64 acquires the maximum tool weight inputted to the tool weight input unit 60 of the display operating device 14, and the process proceeds to step S12.

At step S12, the recommended turning operation speed acquisition unit 66 acquires the recommended turning operation speed corresponding to the maximum tool weight acquired by the tool weight acquisition unit 64, and the process proceeds to step S13. At step S13, the initial turning operation speed setting unit 52 sets the initial value of the turning operation speed of the tool magazine 28 to the recommended turning operation speed acquired by the recommended turning operation speed acquisition unit 66, and the process proceeds to step S14.

At step S14, the display control unit 54 controls the display operating device 14 to display the turning operation speed adjusting unit 46, and the process proceeds to step S15. At step S15, the display control unit 54 controls the display operating device 14 to display the recommended turning operation speed information 48, and the process proceeds to step S16.

At step S16, the turning operation speed acquisition unit 56 acquires the turning operation speed of the tool magazine 28 that has been adjusted by the user operating the turning operation speed adjusting unit 46, and the process proceeds to step S17.

At step S17, the notification determining unit 68 determines whether or not the turning operation speed of the tool magazine 28 after the adjustment is faster than the recommended turning operation speed. The process proceeds to step S18 if the turning operation speed of the tool magazine 28 after the adjustment is faster than the recommended turning operation speed, whereas the process proceeds to step S19 if the turning operation speed of the tool magazine 28 after the adjustment is equal to or less than the recommended turning operation speed.

At step S18, the display control unit 54 controls the display operating device 14 to display the notification information 62, and the process proceeds to step S19. At step S19, the motor control unit 58 controls the turning motor 36 based on the turning operation speed of the tool magazine 28 acquired at step S16, and the process is ended.

[Operation and Effects]

In the present embodiment, the recommended turning operation speed acquisition unit 66 is configured to acquire the recommended turning operation speed of the tool magazine 28 in correspondence to the maximum tool weight acquired by the tool weight acquisition unit 64, and the display operating device 14 is configured to display the recommended turning operation speed information 48 that indicates a position on the bar 51 corresponding to the recommended turning operation speed. With the configuration, it is possible for the user to adjust the turning operation speed of the tool magazine 28 by operating the slider 50 while using as a reference the position on the bar 51 indicated by the recommended turning operation speed information 48.

Further, in the present embodiment, the recommended turning operation speed is set to the initial turning operation speed. With this configuration, since the recommended turning operation speed is set to the initial turning operation speed, it is possible to set the turning operation speed of the tool magazine 28 to an appropriate speed even if the user does not operate the turning operation speed adjusting unit 46.

Further, in the present embodiment, the display operating device 14 is configured to display the notification information 62 in the case where the turning operation speed of the tool magazine 28 that has been adjusted by the user operating the turning operation speed adjusting unit 46 is faster than the recommended turning operation speed. With this configuration, it is possible for the user to recognize that the user is trying to set the turning operation speed of the tool magazine 28 to be faster than the recommended turning operation speed.

Third Embodiment

A third embodiment partly differs from the first embodiment in the contents displayed by the display operating device 14 and the contents controlled by the control device 16. The configuration of the machine tool body 12 is the same as that in the first embodiment.

[Configuration of Machine Tool]

(Configuration of Display Operating Device)

Figure 10:
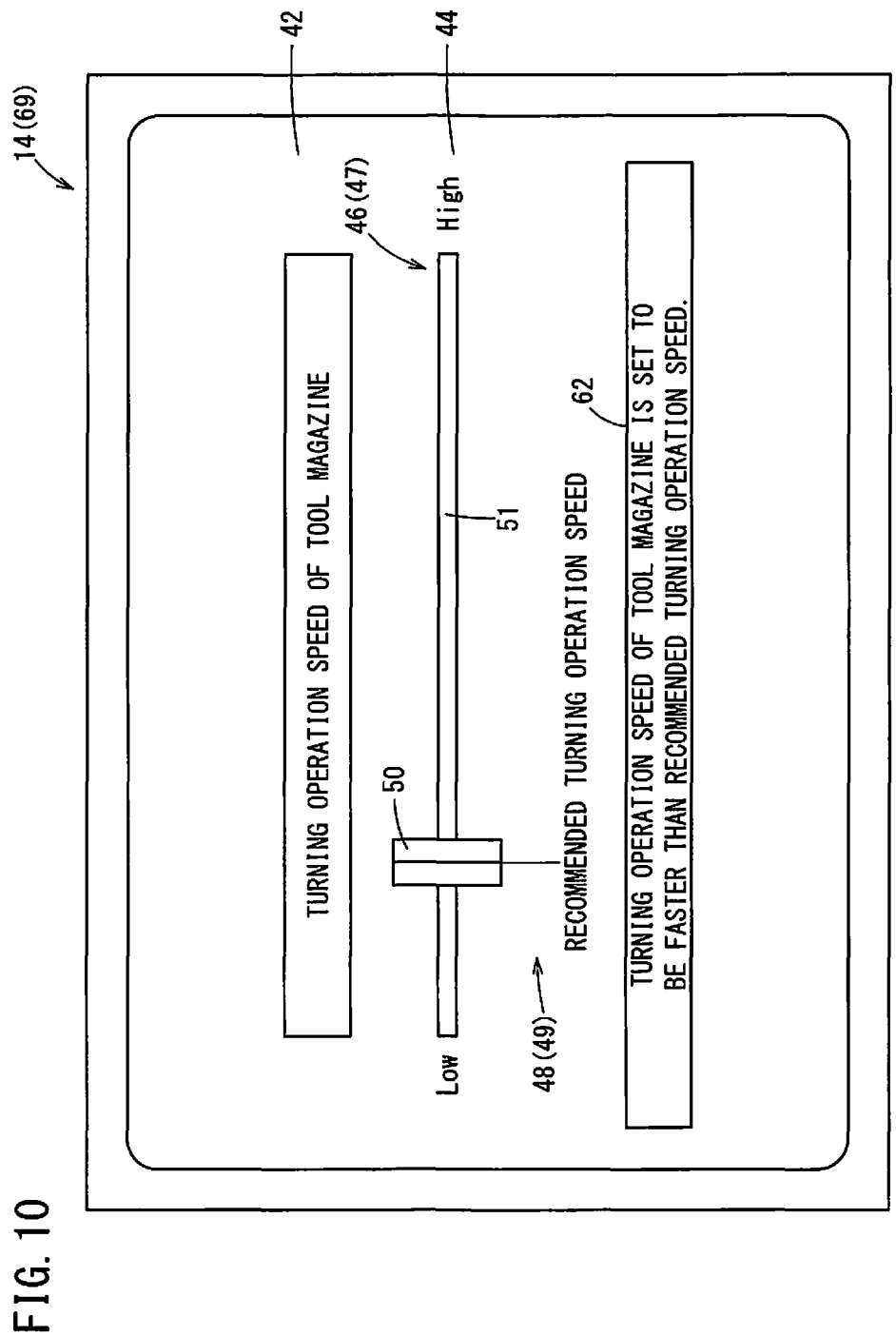
FIG. 10 is a schematic view showing a display operating device in a third embodiment of the present invention.

FIG. 10 is a schematic view showing the display operating device 14 in the third embodiment. The turning operation speed adjusting unit 46, the recommended turning operation speed information 48 and the notification information 62 are displayed on the display operating device 14.

The adjustment of the turning operation speed of the tool magazine 28 is made by the user operating through the touch panel 44 the turning operation speed adjusting unit 46 displayed on the display unit 42. As shown in FIG. 10, the turning operation speed adjusting unit 46 is displayed on the display unit 42 in the form of the slider 50 movable along the bar 51. The adjustment of the turning operation speed of the tool magazine 28 is made by the user sliding the slider 50.

The recommended turning operation speed information 48 indicates a position on the bar 51 corresponding to the recommended turning operation speed which depends on a load exerted on the turning motor 36 acquired by a load acquisition unit 70 as described later. The notification information 62 is displayed when the user operates the slider 50 to move the slider to a "High" side beyond the position on the bar 51 indicated by the recommended turning operation speed information 48.

(Configuration of Control Device)

Figure 11:
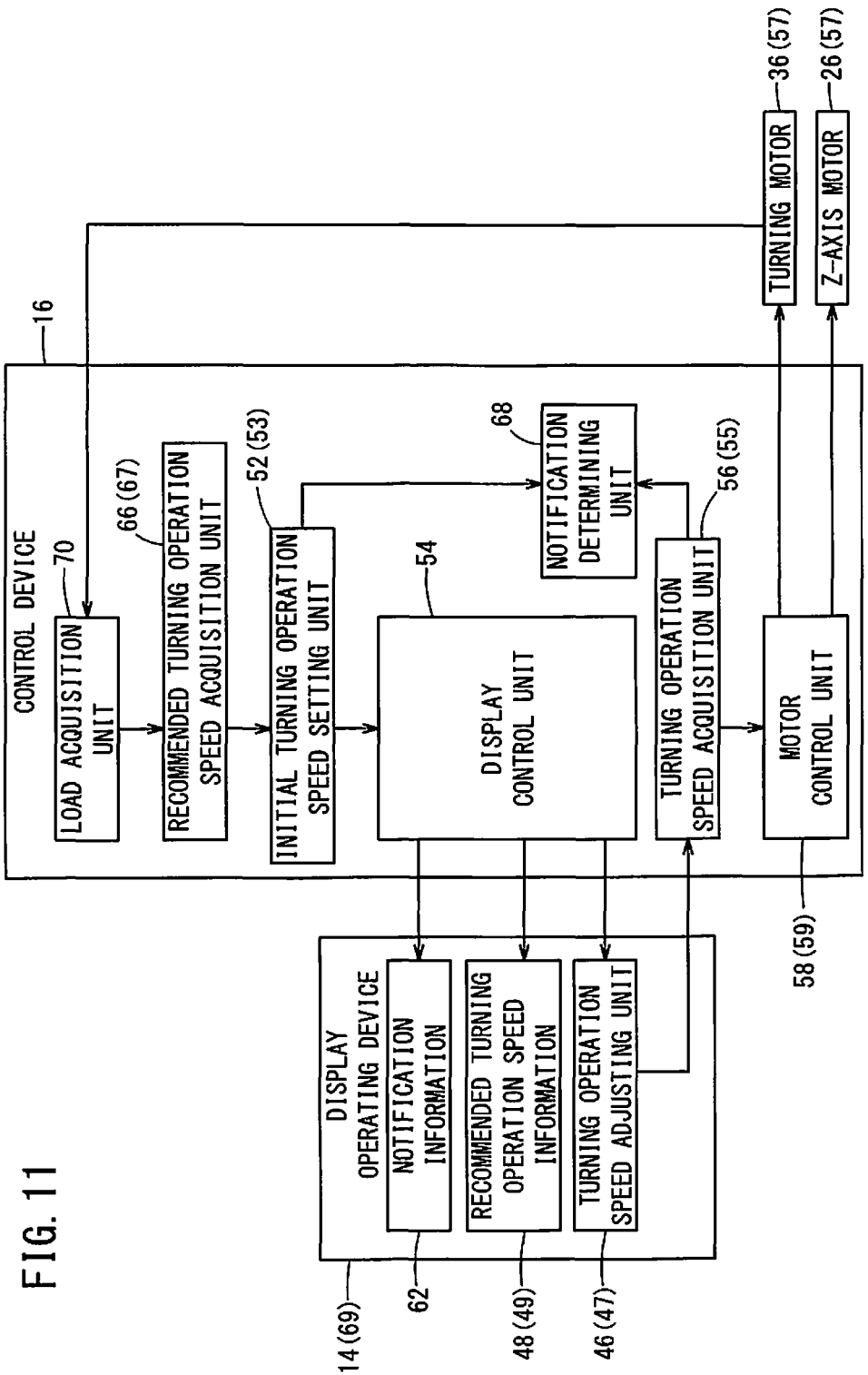
FIG. 11 is a block diagram showing the functional configuration of a control device in the third embodiment.

FIG. 11 is a block diagram showing the functional configuration of the control device 16 in the third embodiment. The control device 16 contains the initial turning operation speed setting unit 52, the display control unit 54, the turning operation speed acquisition unit 56, the motor control unit 58, the recommended turning operation speed acquisition unit 66, the notification determining unit 68 and a load acquisition unit 70.

The motor control unit 58 drives the turning motor 36 to turn the tool magazine 28 before the machine tool body 12 starts a machining operation. The load acquisition unit 70 acquires a load on the turning motor 36 at this time. The recommended turning operation speed acquisition unit 66 acquires a recommended turning operation speed corresponding to the load on the turning motor 36 acquired by the load acquisition unit 70. The recommended turning operation speed acquisition unit 66 may acquire the recommended turning operation speed from a predetermined map representing the relationship between load on the turning motor 36 and recommended turning operation speed, or may acquire the recommended turning operation speed by calculation according to a calculation formula set in advance.

The initial turning operation speed setting unit 52 sets an initial value of the turning operation speed of the tool magazine 28. In the present embodiment, the recommended turning operation speed acquired by the recommended turning operation speed acquisition unit 66 is set to the initial value of the turning operation speed of the tool magazine 28.

The turning operation speed acquisition unit 56 acquires a turning operation speed of the tool magazine 28 after an adjustment of the turning operation speed made by the turning operation speed adjusting unit 46. The notification determining unit 68 determines whether or not the turning operation speed of the tool magazine 28 adjusted by the turning operation speed adjusting unit 46 and which is acquired by the turning operation speed acquisition unit 56 is faster than the recommended turning operation speed acquired by the recommended turning operation speed acquisition unit 66. In the case of where the turning operation speed of the tool magazine 28 after the adjustment is faster than the recommended turning operation speed, the notification determining unit 68 outputs a command to the display operating device 14 so as to display the notification information 62.

The display control unit 54 controls the display operating device 14 to display the turning operation speed adjusting unit 46 and the recommended turning operation speed information 48. The display control unit 54 controls the display operating device 14 to display the slider 50 of the turning operation speed adjusting unit 46 at a position on the bar 51 corresponding to the initial value of the turning operation speed of the tool magazine 28.

In the case where the notification determining unit 68 determines that the turning operation speed of the tool magazine 28 after the adjustment is faster than the recommended turning operation speed, the display control unit 54 controls the display operating device 14 to display notification information 62.

[Turning Operation Speed Adjusting Process]

Figure 12:
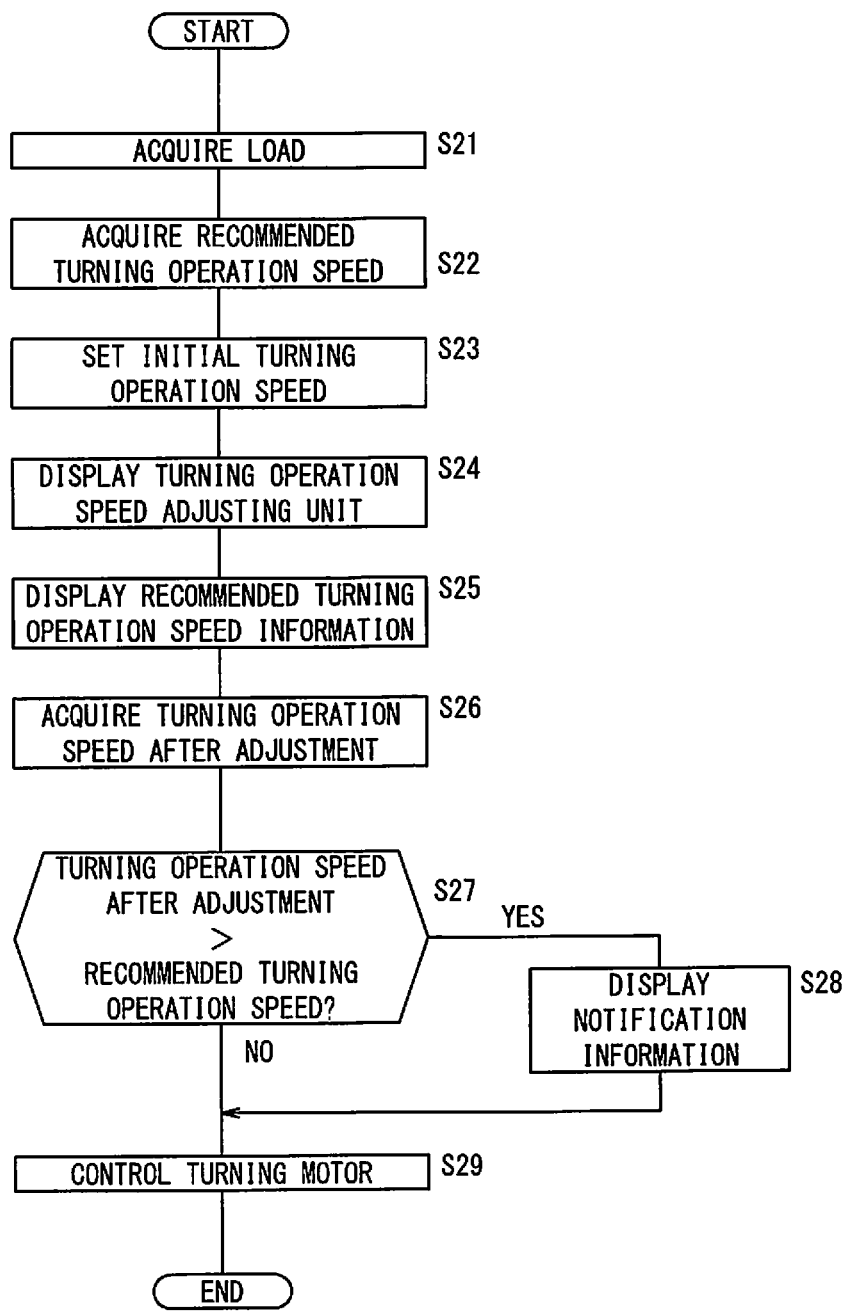
FIG. 12 is a flowchart showing the flow of turning operation speed adjusting process executed by the control device in the third embodiment.

FIG. 12 is a flowchart showing the flow of turning operation speed adjusting process executed by the control device 16. At step S21, the load acquisition unit 70 acquires a load on the turning motor 36, and the process proceeds to step S22.

At step S22, the recommended turning operation speed acquisition unit 66 acquires the recommended turning operation speed corresponding to the load on the turning motor 36 acquired by the load acquisition unit 70, and the process proceeds to step S23. At step S23, the initial turning operation speed setting unit 52 sets the initial value of the turning operation speed of the tool magazine 28 to the recommended turning operation speed acquired by the recommended turning operation speed acquisition unit 66, and the process proceeds to step S24.

At step S24, the display control unit 54 controls the display operating device 14 to display the turning operation speed adjusting unit 46, and the process proceeds to step S25. At step S25, the display control unit 54 controls the display operating device 14 to display the recommended turning operation speed information 48, and the process proceeds to step S26.

At step S26, the turning operation speed acquisition unit 56 acquires the turning operation speed of the tool magazine 28 after an adjustment of the turning operation speed made by the user operating the turning operation speed adjusting unit 46, and the process proceeds to step S27.

At step S27, the notification determining unit 68 determines whether or not the turning operation speed of the tool magazine 28 after the adjustment is faster than the recommended turning operation speed. The process proceeds to step S28 if the turning operation speed of the tool magazine 28 after the adjustment is faster than the recommended turning operation speed, whereas the process proceeds to step S29 if the turning operation speed of the tool magazine 28 after the adjustment is equal to or less than the recommended turning operation speed.

At step S28, the display control unit 54 controls the display operating device 14 to display the notification information 62, and the process proceeds to step S29. At step S29, the motor control unit 58 controls the Z-axis motor 26 and the turning motor 36 based on the turning operation speed of the tool magazine 28 acquired at step S26, and the process is ended.

[Operation and Effects]

In the present embodiment, the recommended turning operation speed acquisition unit 66 is configured to acquire the recommended turning operation speed of the tool magazine 28 in accordance with the load on the turning motor 36 acquired by the load acquisition unit 70, and the display operating device 14 is configured to display the recommended turning operation speed information 48 indicating a position on the bar 51 which corresponds to the recommended turning operation speed. With this configuration, it is possible for the user to adjust the turning operation speed of the tool magazine 28 by operating the slider 50 while using as a reference the position on the bar 51 indicated by the recommended turning operation speed information 48.

Further, in the present embodiment, the recommended turning operation speed is set to the initial turning operation speed. With this configuration, since the recommended turning operation speed is set to the initial turning operation speed, it is possible to set the turning operation speed of the tool magazine 28 to an appropriate speed even if the user does not operate the turning operation speed adjusting unit 46.

Further, in the present embodiment, the display operating device 14 is configured to display the notification information 62 in the case where the turning operation speed of the tool magazine 28 after the adjustment made by the user operating the turning operation speed adjusting unit 46 is faster than the recommended turning operation speed. With this configuration, it is possible for the user to recognize that the user is trying to set the turning operation speed of the tool magazine 28 to be faster than the recommended turning operation speed.

Fourth Embodiment

In the first embodiment, the turning operation speed adjusting unit 46 is configured to adjust the turning operation speed of the tool magazine 28. However, in a fourth embodiment, in addition to the turning operation speed adjusting unit 46, a swinging operation speed adjusting unit 72 for adjusting the swinging operation speed of the tool magazine 28 is provided.

[Configuration of Machine Tool]

(Configuration of Display Operating Device)

Figure 13:
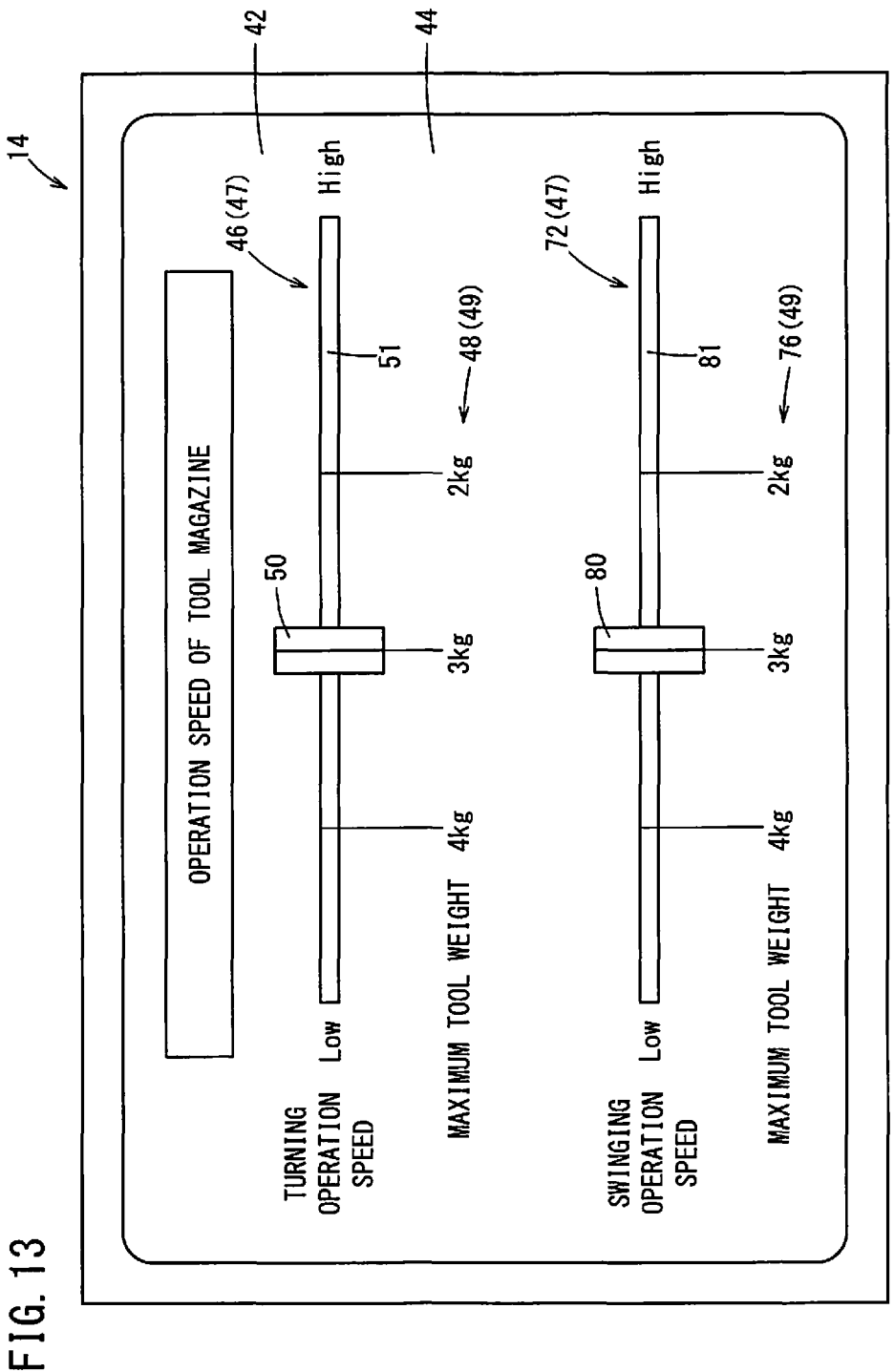
FIG. 13 is a schematic view showing a display operating device in a fourth embodiment of the present invention.

FIG. 13 is a schematic view showing the display operating device 14 in the fourth embodiment. The turning operation speed adjusting unit 46, the recommended turning operation speed information 48, the swinging operation speed adjusting unit 72 and recommended swinging operation speed information 76 are displayed on the display operating device 14. Adjustments of the turning operation speed and the swinging operation speed of the tool magazine 28 are made by the user operating through the touch panel 44 the turning operation speed adjusting unit 46 and the swinging operation speed adjusting unit 72 displayed on the display unit 42. As shown in FIG. 13, the turning operation speed adjusting unit 46 is displayed on the display unit 42 in the form of the slider 50 movable along the bar 51. As shown also in FIG. 13, the swinging operation speed adjusting unit 72 is displayed on the display unit 42 in the form of a slider 80 movable along a bar 81. The adjustment of the turning operation speed of the tool magazine 28 is made by the user sliding the slider 50. The adjustment of the swinging operation speed of the tool magazine 28 is made by the user sliding the slider 80. The turning operation speed adjusting unit 46 and the swinging operation speed adjusting unit 72 constitute the operation speed adjusting unit 47.

The recommended turning operation speed and the recommended swinging operation speed of the tool magazine 28 are determined in advance in accordance with the weight of the heaviest tool 20 (maximum tool weight) of the tools 20 attached to the tool magazine 28. The recommended turning operation speed information 48 and the recommended swinging operation speed information 76 indicate positions on the bars 51, 81 corresponding respectively to the recommended turning operation speeds and the recommended swinging operation speeds for respective predetermined weights (2 kg, 3 kg, 4 kg, for example) of the tools 20. The recommended turning operation speed information 48 and the recommended swinging operation speed information 76 constitute recommended operation speed information 49.

(Configuration of Control Device)

Figure 14:
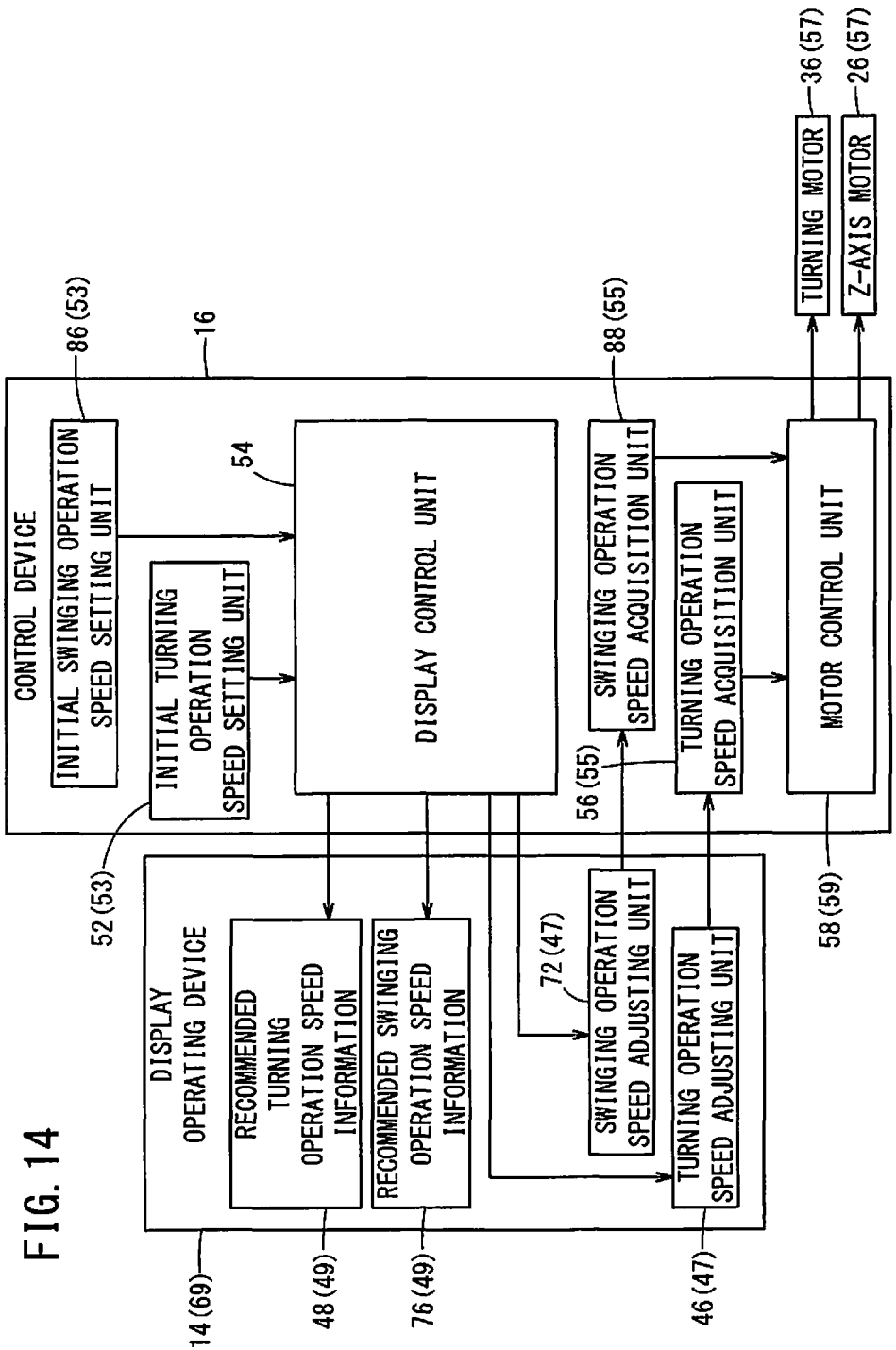
FIG. 14 is a block diagram showing the functional configuration of a control device in the fourth embodiment.

FIG. 14 is a block diagram showing the functional configuration of the control device 16 in the fourth embodiment. The control device 16 contains the initial turning operation speed setting unit 52, the display control unit 54, the turning operation speed acquisition unit 56, the motor control unit 58, an initial swinging operation speed setting unit 86, and a swinging operation speed acquisition unit 88.

The initial turning operation speed setting unit 52 sets an initial value of the turning operation speed of the tool magazine 28. The initial swinging operation speed setting unit 86 sets an initial value of the swinging operation speed of the tool magazine 28. In the present embodiment, a recommended turning operation speed corresponding to the case of the maximum tool weight being 3 kg is set to the initial value of the turning operation speed of the tool magazine 28. Further, a recommended swinging operation speed corresponding to the case of the maximum tool weight being 3 kg is set to the initial value of the swinging operation speed of the tool magazine 28. Incidentally, the initial values of the turning operation speed and the swinging operation speed of the tool magazine 28 are not limited to the recommended turning operation speed and the recommended swinging operation speed corresponding to the case of the maximum tool weight being 3 kg. The initial turning operation speed setting unit 52 and the initial swinging operation speed setting unit 86 constitute the initial operation speed setting unit 53.

The display control unit 54 controls the display operating device 14 to display the turning operation speed adjusting unit 46 and the recommended turning operation speed information 48. Further, the display control unit 54 controls the display operating device 14 to display the swinging operation speed adjusting unit 72 and the recommended swinging operation speed information 76.

The display control unit 54 controls the display operating device 14 to display the slider 50 of the turning operation speed adjusting unit 46 at a position on the bar 51 corresponding to the initial value (i.e., the recommended turning operation speed corresponding to the case of the maximum tool weight being 3 kg) of the turning operation speed of the tool magazine 28. The display control unit 54 controls the display operating device 14 to display the slider 80 of the swinging operation speed adjusting unit 72 at a position on the bar 81 corresponding to the initial value (i.e., the recommended swinging operation speed corresponding to the case of the maximum tool weight being 3 kg) of the swinging operation speed of the tool magazine 28.

The user is able to adjust the turning operation speed of the tool magazine 28 by moving the slider 50. Further, the user is able to adjust the swinging operation speed of the tool magazine 28 by moving the slider 80. The turning operation speed acquisition unit 56 acquires a turning operation speed of the tool magazine 28 after adjustment of the turning operation speed made by the turning operation speed adjusting unit 46. Further, the swinging operation speed acquisition unit 88 acquires a swinging operation speed of the tool magazine 28 after adjustment of the swinging operation speed made by the swinging operation speed adjusting unit 72. The turning operation speed acquisition unit 56 and the swinging operation speed acquisition unit 88 constitute the operation speed acquisition unit 55.

The motor control unit 58 controls the Z-axis motor 26 and the turning motor 36 to thereby cause the tool magazine 28 to change the tool 20 on the spindle 18. At this time, the motor control unit 58 controls the turning motor 36 in accordance with the turning operation speed of the tool magazine 28 that has been adjusted by the turning operation speed adjusting unit 46. Further, the motor control unit 58 controls the Z-axis motor 26 in accordance with the swinging operation speed of the tool magazine 28 that has been adjusted by the swinging operation speed adjusting unit 72.

[Operation Speed Adjusting Process]

FIG. 15 is a flowchart showing the flow of operation speed adjusting process executed by the control device 16. At step S31, the initial turning operation speed setting unit 52 sets the initial value of the turning operation speed of the tool magazine 28, and the process proceeds to step S32. At step S32, the initial swinging operation speed setting unit 86 sets the initial value of the swinging operation speed of the tool magazine 28, and the process proceeds to step S33.

At step S33, the display control unit 54 controls the display operating device 14 to display the turning operation speed adjusting unit 46, and the process proceeds to step S34. At step S34, the display control unit 54 controls the display operating device 14 to display the swinging operation speed adjusting unit 72, and the process proceeds to step S35.

At step S35, the display control unit 54 controls the display operating device 14 to display the recommended turning operation speed information 48, and the process proceeds to step S36. At step S36, the display control unit 54 controls the display operating device 14 to display the recommended swinging operation speed information 76, and the process proceeds to step S37.

At step S37, the turning operation speed acquisition unit 56 acquires the turning operation speed of the tool magazine 28 after the adjustment made by the user operating the turning operation speed adjusting unit 46, and the process proceeds to step S38. At step S38, the swinging operation speed acquisition unit 88 acquires the swinging operation speed of the tool magazine 28 after the adjustment made by the user operating the swinging operation speed adjusting unit 72, and the process proceeds to step S39.

At step S39, the motor control unit 58 controls the turning motor 36 based on the turning operation speed of the tool magazine 28 acquired at step S37, and at the same time, controls the Z-axis motor 26 based on the swinging operation speed of the tool magazine 28 acquired at step S38, and the process is ended.

[Operation and Effects]

In the present embodiment, the turning operation speed adjusting unit 46 for adjusting the turning operation speed of the tool magazine 28 and the swinging operation speed adjusting unit 72 for adjusting the swinging operation speed of the tool magazine 28 are provided. Owing thereto, it is possible to adjust the turning operation speed and the swinging operation speed of the tool magazine 28.

[First Modification]

The turning operation speed adjusting unit 46 in the first to fourth embodiments may be configured as a dial 92 instead of the slider 50. FIG. 16 is a schematic view showing the display operating device 14. The turning operation speed adjusting unit 46 and the recommended turning operation speed information 48 are displayed on the display unit 42 of the display operating device 14. As shown in FIG. 16, the turning operation speed adjusting unit 46 is displayed in the form of the dial 92 on the display operating device 14. When the user turns the dial 92, the turning operation speed of the tool magazine 28 is adjusted. Incidentally, the slider 80 of the swinging operation speed adjusting unit 72 in the fourth embodiment may also be configured in the form of a dial.

[Second Modification]

In the first to third embodiments, the slider 50 is used to adjust the turning operation speed of the tool magazine 28. However, a single slider 50 may be used to simultaneously adjust the turning operation speed and the swinging operation speed of the tool magazine 28.

[Technical Concepts Graspable from Embodiments]

The technical concepts graspable from the foregoing embodiments will be described hereunder.

The machine tool (10) includes the tool magazine (28) configured to change the tool (20) attached to the spindle (18) and further includes the initial operation speed setting unit (53) configured to set the operation speed of the tool magazine (28) to the initial operation speed, the operation speed adjusting unit (47) configured to be operated by the user to thereby adjust the operation speed of the tool magazine (28) relative to the initial operation speed, the actuator (57) configured to operate (actuate) the tool magazine (28), the operation speed acquisition unit (55) configured to acquire the operation speed of the tool magazine (28) after adjustment of the operation speed made by the operation speed adjusting unit (47), and the actuator control unit (59) configured to control the actuator (57) to operate (actuate) the tool magazine (28) at the operation speed acquired by the operation speed acquisition unit (55). With this configuration, it is possible to adjust the operation speed of the tool magazine (28) to an operation speed desired by the user.

In the aforementioned machine tool (10), the operation speed adjusting unit (47) may be configured to display recommended operation speed information (49) indicative of an adjusting position on the operation speed adjusting unit (47), the adjusting position corresponding to a recommended operation speed of the tool magazine (28) recommended for the weight of the tool (20). With this configuration, it is possible for the user to adjust the operation speed of the tool magazine (28) by using as a reference the adjusting position corresponding to the recommended operation speed indicated by the recommended operation speed information (49).

The aforementioned machine tool (10) may further include the tool weight acquisition unit (64) configured to acquire the weight of the tool (20) changed by the tool magazine (28), and the recommended operation speed acquisition unit (67) configured to acquire a recommended operation speed of the tool magazine (28) recommended for the acquired weight of the tool (20), and the operation speed adjusting unit (47) may be configured to display recommended operation speed information (49) indicative of an adjusting position on the operation speed adjusting unit (47), the adjusting position corresponding to the acquired recommended operation speed. With this configuration, it is possible for the user to adjust the operation speed of the tool magazine (28) by using as a reference the adjusting position on the operation speed adjusting unit (47) indicated by the recommended operation speed information (49).

The aforementioned machine tool (10) may further include the load acquisition unit (70) configured to acquire a load on the actuator (57), and the recommended operation speed acquisition unit (67) configured to acquire a recommended operation speed of the tool magazine (28) recommended for the acquired load on the actuator (57), and the operation speed adjusting unit (47) may be configured to display recommended operation speed information (49) indicative of an adjusting position on the operation speed adjusting unit (47), the adjusting position corresponding to the acquired recommended operation speed. With this configuration, it is possible for the user to adjust the operation speed of the tool magazine (28) by using as a reference the adjusting position on the operation speed adjusting unit (47) indicated by the recommended operation speed information (49).

The aforementioned machine tool (10) may further include the tool weight acquisition unit (64) configured to acquire the weight of the tool (20) changed by the tool magazine (28), and the recommended operation speed acquisition unit (67) configured to acquire the recommended operation speed of the tool magazine (28) recommended for the acquired weight of the tool (20), and the initial operation speed setting unit (53) may be configured to set the recommended operation speed to the initial operation speed. With this configuration, since the initial operation speed is set to the recommended operation speed, it is possible to adjust the operation speed of the tool magazine (28) to an appropriate speed even if the user does not operate the operation speed adjusting unit (47).

The aforementioned machine tool (10) may further include the load acquisition unit (70) configured to acquire a load on the actuator (57), and the recommended operation speed acquisition unit (67) configured to acquire the recommended operation speed of the tool magazine (28) recommended for the acquired load on the actuator (57), and the initial operation speed setting unit (53) may be configured to set the recommended operation speed to the initial operation speed. With this configuration, since the initial operation speed is set to the recommended operation speed, it is possible to adjust the operation speed of the tool magazine (28) to an appropriate speed without operation performed by the user on the operation speed adjusting unit (47).

The aforementioned machine tool (10) may further include a notification unit (69) configured to, if the operation speed after the adjustment made by the operation speed adjusting unit is faster than the recommended operation speed, notify the user that the operation speed after the adjustment by the operation speed adjusting unit (47) is faster than the recommended operation speed. With this configuration, it is possible for the user to recognize that the user is trying to set the operation speed of the tool magazine (28) to be faster than the recommended operation speed.

In the aforementioned machine tool (10), the tool magazine (28) may be the turret (32) provided with a plurality of grips (34) each configured to hold the tool (20), the turret (32) may be configured to perform a turning operation for indexing the tool (20) desired and a swinging operation for attaching the indexed tool (20) to the spindle (18), the initial operation speed setting unit (53) may include the initial turning operation speed setting unit (52) configured to set the initial operation speed of the turning operation, and the initial swinging operation speed setting unit (86) configured to set the initial operation speed of the swinging operation, and the operation speed adjusting unit (47) may include the turning operation speed adjusting unit (46) configured to adjust the operation speed of the turning operation relative to the initial operation speed of the turning operation, and the swinging operation speed adjusting unit (72) configured to adjust the operation speed of the swinging operation relative to the initial operation speed of the swinging operation. With this configuration, it is possible to adjust the swinging operation speed and the turning operation speed of the tool magazine (28).

In the aforementioned machine tool (10), the operation speed adjusting unit (47) may be the slider (50, 80) configured to be slid by the user to thereby adjust the operation speed of the tool magazine (28) relative to the initial operation speed. With this configuration, it is possible for the user to input the operation speed of the tool magazine (28), not numerically, but in a manner that the operation speed of the tool magazine (28) is relatively speeded up or slowed down with respect to the initial value.

In the aforementioned machine tool (10), the operation speed adjusting unit (47) may be the dial (92) configured to be turned by the user to thereby adjust the operation speed of the tool magazine (28) relative to the initial operation speed. With this configuration, it is possible for the user to input the operation speed of the tool magazine (28), not numerically, but in a manner that the operation speed of the tool magazine (28) is relatively speeded up or slowed down with respect to the initial value.

The control method for the machine tool (10) having the tool magazine (28) for changing the tool (20) attached to the spindle (18) includes an initial operation speed setting step of setting the operation speed of the tool magazine (28) to an initial operation speed, an operation speed adjusting step of adjusting the operation speed of the tool magazine (28) relative to the initial operation speed by the operation speed adjusting unit (47) being operated by the user, an operation speed acquisition step of acquiring the operation speed of the tool magazine (28) after the adjustment in the operation speed adjusting step, and an actuator control step of controlling the actuator (57) configured to actuate the tool magazine (28), so that the tool magazine (28) operates at the operation speed acquired in the operation speed acquisition step. With the above, it is possible to adjust the operation speed of the tool magazine (28) to an operation speed desired by the user.

The aforementioned control method for the machine tool (10) may further include a recommended operation speed information display step of displaying, in the operation speed adjusting unit (47), recommended operation speed information (49) indicative of an adjusting position on the operation speed adjusting unit (47), the adjusting position corresponding to a recommended operation speed of the tool magazine (28) recommended for the weight of the tool (20). With this configuration, it is possible for the user to adjust the operation speed of the tool magazine (28) by using as a reference the adjusting position corresponding to the recommended operation speed and indicated by the recommended operation speed information (49).

The aforementioned control method for the machine tool (10) may further include a tool weight acquisition step of acquiring the weight of the tool (20) changed by the tool magazine (28), a recommended operation speed acquisition step of acquiring a recommended operation speed of the tool magazine (28) recommended for the acquired weight of the tool (20), and a recommended operation speed information display step of displaying, in the operation speed adjusting unit (47), recommended operation speed information (49) indicative of an adjusting position on the operation speed adjusting unit (47), the adjusting position corresponding to the acquired recommended operation speed. With the above configuration, it is possible for the user to adjust the operation speed of the tool magazine (28) by using as a reference the adjusting position corresponding to the recommended operation speed indicated by the recommended operation speed information (49).

The aforementioned control method for the machine tool (10) may further include a load acquisition step of acquiring a load on the actuator (57), a recommended operation speed acquisition step of acquiring a recommended operation speed of the tool magazine (28) recommended for the acquired load on the actuator (57), and a recommended operation speed information display step of displaying, in the operation speed adjusting unit (47), recommended operation speed information (49) indicative of an adjusting position on the operation speed adjusting unit (47), the adjusting position corresponding to the acquired recommended operation speed. With the above configuration, it is possible for the user to adjust the operation speed of the tool magazine (28) by using as a reference the adjusting position corresponding to the recommended operation speed indicated by the recommended operation speed information (49).

The aforementioned control method for the machine tool (10) may further include a tool weight acquisition step of acquiring the weight of the tool (20) changed by the tool magazine (28), and a recommended operation speed acquisition step of acquiring a recommended operation speed of the tool magazine (28) recommended for the acquired weight of the tool (20), and the initial operation speed setting step may set the initial operation speed to the recommended operation speed. With the above configuration, since the initial operation speed is set to the recommended operation speed, it is possible to adjust the operation speed of the tool magazine (28) to an appropriate speed even if the user does not operate the operation speed adjusting unit (47).

The present invention is not particularly limited to the embodiments described above, and various modifications are possible without departing from the essence and gist of the present invention.

What is claimed is:

1. A machine tool comprising a tool magazine configured to change a tool attached to a spindle, the machine tool further comprising:
    a control device including:
        an initial turning operation speed setter that is configured to set an initial turning operation speed of a turning operation of the tool magazine; and
        an initial swinging operation speed setter configured to set an initial swinging operation speed of a swinging operation of the tool magazine with respect to the spindle;
    a display device including:
        a turning operation speed slider that is movable along a first bar of the display device such that a user can adjust a turning operation speed of the turning operation of the tool magazine relative to the initial turning operation speed; and
        a swinging operation speed slider that is movable along a second bar of the display device such that the user can adjust a swinging operation speed of the swinging operation of the tool magazine relative to the initial swinging operation speed;
    an actuator configured to actuate the tool magazine;
    an actuator control configured to control the actuator to actuate the tool magazine at the turning operation speed of the turning operation,
    wherein:
    the control device is configured to acquire the turning operation speed of the turning operation of the tool magazine after adjustment of said turning operation speed of said turning operation;
    the tool magazine is a turret provided with a plurality of grips, each of which is configured to hold the tool;

the turret is configured to perform the turning operation for indexing the tool and the swinging operation for attaching the tool to the spindle.

2. The machine tool according to claim 1, wherein the display device is configured to display recommended turning operation speed information indicative of an adjusting position, the adjusting position corresponding to a recommended turning operation speed of the tool magazine recommended for a weight of the tool.

3. The machine tool according to claim 1, wherein the control device is further configured to:
 acquire a weight of the tool changed by the tool magazine; and
 acquire a recommended turning operation speed of the tool magazine recommended for the acquired weight of the tool,
 wherein the display device is further configured to display recommended turning operation speed information indicative of an adjusting position, the adjusting position corresponding to the acquired recommended turning operation speed.

4. The machine tool according to claim 3, wherein the display device is further configured to, if the turning operation speed adjusted by the user is faster than the recommended turning operation speed, notify the user that the turning operation speed adjusted by the user is faster than the recommended turning operation speed.

5. The machine tool according to claim 1, wherein the control device is further configured to:
 acquire a load on the actuator; and
 acquire a recommended turning operation speed of the tool magazine recommended for the acquired load on the actuator,
 wherein the display device is further configured to display recommended turning operation speed information indicative of an adjusting position, the adjusting position corresponding to the acquired recommended turning operation speed.

6. The machine tool according to claim 1, wherein the control device is further configured to:
 acquire a weight of the tool changed by the tool magazine; and
 acquire a recommended turning operation speed of the tool magazine recommended for the acquired weight of the tool,
 wherein the initial turning operation speed setter is further configured to set the recommended turning operation speed as the initial turning operation speed.

7. The machine tool according to claim 1, wherein the control device is further configured to:
 acquire a load on the actuator; and
 acquire a recommended turning operation speed of the tool magazine recommended for the acquired load on the actuator,
 wherein the initial turning operation speed setter is further configured to set the recommended turning operation speed as the initial turning operation speed.

* * * * *